Oct. 7, 1969     T. M. BARNES     3,471,083

PUNCH CARD METER READING DEVICE

Filed Jan. 18, 1967     2 Sheets-Sheet 1

INVENTOR

THOMAS M. BARNES

BY *Willard J. Hodges Jr.*

ATTORNEY

Oct. 7, 1969 T. M. BARNES 3,471,083
PUNCH CARD METER READING DEVICE
Filed Jan. 18, 1967 2 Sheets-Sheet 2

INVENTOR
THOMAS M. BARNES
BY
ATTORNEY

United States Patent Office 3,471,083
Patented Oct. 7, 1969

3,471,083
PUNCH CARD METER READING DEVICE
Thomas M. Barnes, 433 Avondale,
San Antonio, Tex. 78223
Filed Jan. 18, 1967, Ser. No. 610,169
Int. Cl. G06k 1/08; G01r 13/04; G01d 15/04
U.S. Cl. 234—30
8 Claims

ABSTRACT OF THE DISCLOSURE

The combination of a digital metering device rotated proportional to the product dispensed and associated integral punch card reading device which is either electrically or manually activated. The reading device may include identification punch card coding means as well as quantity reading means. The device produces a punch card susceptible of use with punch card data processing equipment for billing and accounting purposes.

---

This apparatus and method disclosed is adapted to read electric and other metering devices by means of a punch card, the insertion of the card and activation of the punching mechanism records the total quantity registered on the meter. The card is designed and of such configuration as to be readily processed in a variety of automatic data processing machines for accounting and billing purposes. The device hereinafter disclosed in detail may be utilized in conjunction with electric, natural gas, and water meters, and gasoline dispensing pumps.

Heretofore public utility companies have employed meter reading personnel to visually read and record totals registered on the meters. These figures are manually computed and total monthly consumption of the utility determined and billings compiled.

In more recent years some thought and study has been made of methods of remote reading of meters. Either of the foregoing methods have inherent difficulties and shortcomings. The former commonly used method is inherently costly in expenditure of time and personnel. The latter experimental methods are inherently costly in equipment.

A primary object of the invention is the providing of a device which is relatively inexpensive to produce which records readings on a punch card readily adaptable to existing data processing equipment for automatic computation and billing. The consequent substantial saving in time and personnel is obvious.

The device hereinafter disclosed in detail will illustrate a preferred embodiment designed for use with an electric watt hour meter. The elimination of the electrical activated solenoid punch system and a modification utilizing a manually activated punch system adapts the device for use wtih gas and water meters. Other modifications adapting the device for gasoline dispensing pumps in conjunction with credit cards in common use will be apparent to one skilled in the art. Other objects and features of the invention will become apparent as the disclosure is made in the following detailed description of a preferred embodiment of the invention as illustrated in the accompanying sheets of drawings in which:

FIG. 1 is a front plan view depicting the face of the improved watt hour meter partially disclosing the disk drive mechanism and the gearing system driving the clocking dials.

FIG. 2 is a side plan view partially in section taken on line 2—2 of FIG. 1 looking in the direction of the arrows. This view partially depicts the punch dials mounted on and driven by the shafts of the clocking mechanism. The solenoid and the electrically activated punch system is illustrated partially in schematic.

FIG. 3 depicts the punch bar or backing plate for the punch blades.

Figure 1:
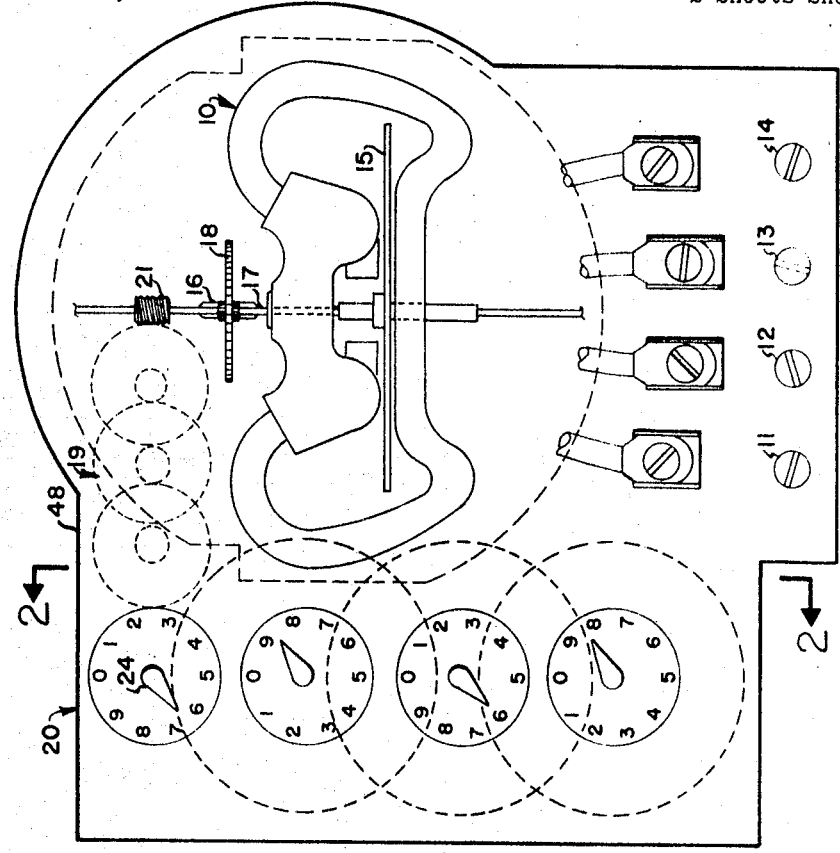

Referring now to the drawings wherein like reference characters designate like or corresponding parts throughout the several views, FIG. 1 illustrates the front plan or face view of the watt hour meter. This patent application does not propose to disclose or claim any improvement in the disk drive mechanism 10 depicted in a general configuration. Highly advanced disk drive mechanisms have evolved since the initial discoveries by Dr. Ferraris, Shullenberger, Duncan, and Gutman. Any of the old or new methods of the disk drive recording watt hours involving single or multiple phase circuits utilizing two (2) or three (3) wire conductors may be incorporated into this invention. A drive mechanism having a substantially wide latitude of light load adjustment would be preferred thereby enabling accurate adjustment to compensate for slightly increased friction. The external source of electrical energy is attached to connecting clamps 11 and 12. The load lines leading to the consuming utility are attached to clamps 13 and 14. The flow of current through the disk drive assembly energizes the electromagnet (not illustrated) which drives the disk 15. The disk drive mechanism must employ suitable lag means, tilt adjustments, and other modern advances (not illustrated). A spur gear 16 is integral with the disk shaft 17. The shaft's spur gear drives a larger spur gear 18 which is interconnected by means of a reduction gear train 19 to the clocking dial assembly 20. The interconecting gear train may employ various reduction gear methods depending on the design selected. A worm gear 21 and a series of large and small spur gears are illustrated. However, various combinations of gears may be incorporated if desired reduction ratios and space demands.

Figure 2:
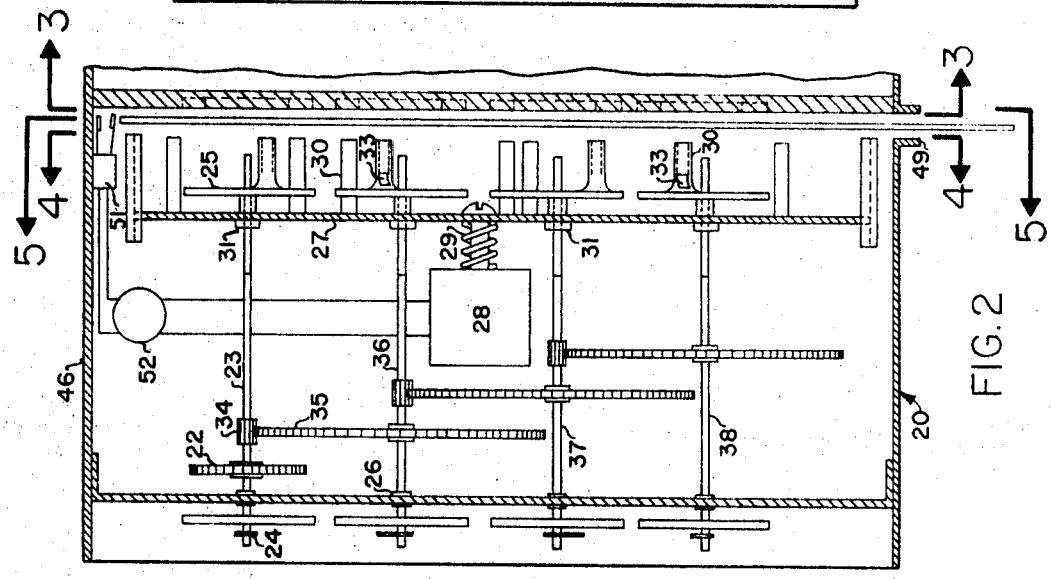

Referring now to FIG. 2, the reduction gear train interconnects the disk, and the clocking dial assembly drives the spur gear 22 which is securely mounted on the first shaft 23. Secured to the face end of the shaft is a clocking dial pointer 24. Movably mounted on the punch end of the shaft is the first punch disk 25. This shaft is mounted in suitable low friction bearing means 26. This first shaft, like the remaining three (3) shafts, projects through a punch blade drive bar 27 which is securely mounted on the armature of a solenoid 28. The solenoid incorporates an integral spring 29 which retains the various punch blades in a withdrawn neutral position. The punch disks are keyed on or movably mounted on a square shaft in such a maner as to drive the punch blades 30 to coincide with the dial pointers. The punch disks are secured to a drive collar 31 which maintains the disk and the drive bar in a constant lateral spaced relationship. The punch bar in a constant lateral spaced relationship. The punch blades may be constructed in various configurations. The blades illustrated in this application includes a cutting tip 32 and a chip channel including a discharge opening 33.

Secured to the first drive shaft is a small spur gear 34 which engages a large spur gear 35 which is mounted on the second shaft 36. In a digital dial system reading in multiples of ten (10), the ratio of these gears is ten (10) to one (1). An identical system of gearing is used to interconnect the third drive shaft 37 and the fourth drive shaft 38. If a five (5) or more dial system were desired, additional dials may be operably attached in series with the four (4) illustrated.

Figure 4:
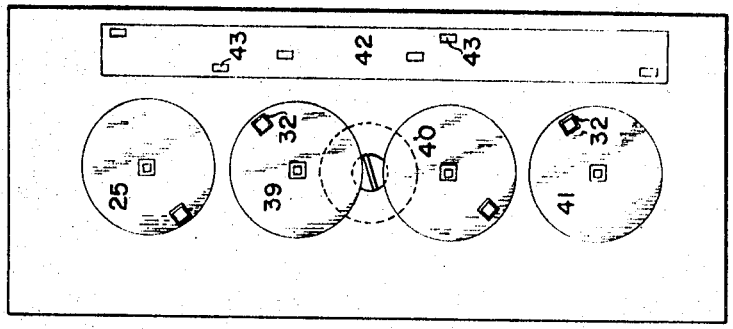
FIG. 4 is a plan view in section of FIG. 2 taken on line 4—4 looking in the direction of the arrows. This view illustrates the punch disk with blades and punch blades for the identification coding.

Referring now to FIG. 4 which illustrates the cutting end of the punch blade assembly. The series of four (4) punch disks are illustrated; the first punch disk is at the top of the figure. The second punch disk is illustrated at 39, the third disk at 40, and the fourth at 41. As previously stated, these disks are mounted on the various drive shafts whereby the cutting blades coincide with the dial pointers. Adjacent to the rotary disk carrying punch blade pointers securely affixed to the punch blade drive bar is the fixed coding bar 42. This bar carries a series of fixed punch blades 43 which may be arranged in substantially an infinite number of configurations for the purpose of coding the meter or identifying the subscriber as the case may be.

Figure 3:
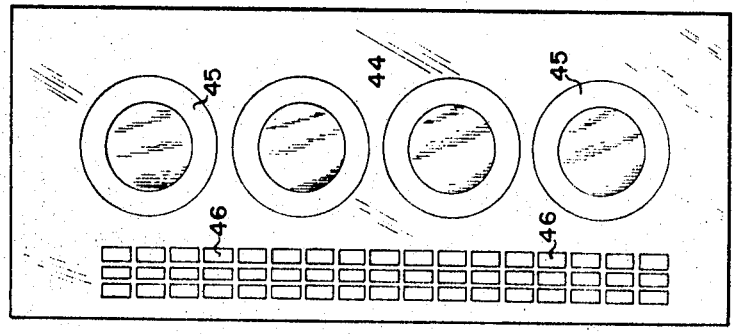
FIG. 3 is a plan view in section of FIG. 2 taken on line 3—3 looking in the direction of the arrows.

FIG. 3 illustrates the punch blade backing plate 44 which contains a series of resilient cushions 45 made of plastic or rubber coinciding with the circular path followed by the punch blades as they rotate. The plate is also constructed with a series of apertures 46 which coincide with the fixed punch blades of the coding bar.

Figure 5:
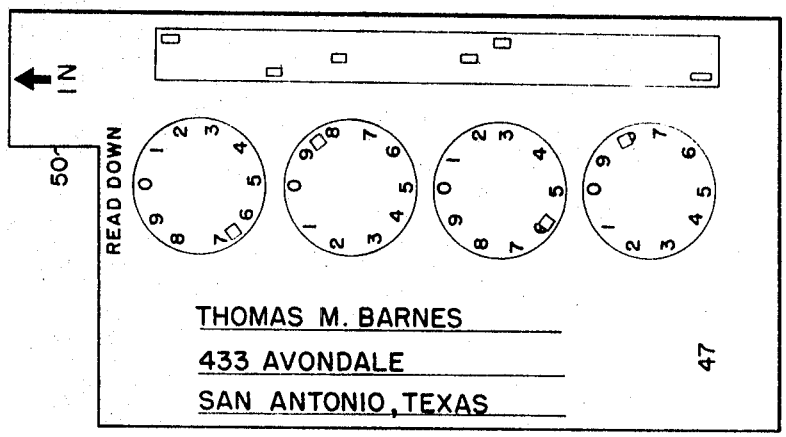
FIG. 5 is a plan view in section of FIG. 2 taken on line 5—5 looking in the direction of the arrows illustrating a punch card which may be inserted into the device and the system activated to record the meter reading.

FIG. 5 illustrates a subscriber's punch card 47 which may be inserted into the mechanism between the cutting end of the punch blade assembly illustrated in FIG. 4 and the punch blade backing plate FIG. 3. When these two (2) assemblies are forced together, the meter reading is punch recorded on the card substantially as illustrated by FIG. 5.

The general configuration of the device and its operation is best described by referring to FIG. 1 and FIG. 2. A preferred embodiment of this invention is mounted adjacent the disk drive mechanism of a watt hour meter. The entire mechanism is enclosed in a waterproof component mounting frame 48. This housing is designed with a card slot 49 over which a waterproof cover (not illustrated) will fit.

A reading of the meter is accomplished by fully inserting the punch card into the card slot. The projection 50 on the card will activate a small microswitch 51 which energizes the circuit to the solenoid. The reason for designing the microswitch into the circuit is to insure a proper inserting of the card prior to activating the circuit to read the meter. After the card is properly inserted and the circuit energized, the pressing of the push button 52 will operate the solenoid which drives the punch blade drive bar forward. The blades will penetrate the subscriber's punch card as it is forced against the backing plate. This one action records the meter reading on the punch card and codes the card to identify the subscriber.

These data are readily usable in various data processing machines to compute billings and record readings for future use.

The advantages to utility companies of this new and novel method of meter reading obviously results in substantial savings of manpower in that the subscriber only needs to insert the card in the meter to accomplish an instantaneous permanent record of the reading. This card can be mailed to the utility company. The company can, with data processing equipment, process the reading for mechanical billing and accounting. The memory circuit of the data processing equipment can retain the current reading for the purpose of computing billings when the following month's punch card is received.

This device with slight modifications is readily adapted to analogous uses. It is recognized that the foregoing disclosure relates primarily to a preferred embodiment of the invention described in particularity as it relates to a watt hour meter.

Having described my improved method and apparatus for practicing my invention, what I claim is:

1. A punch card meter reading device comprising a component mounting frame, a measuring means rotated proportionally to product dispensed, a multiplicity of parallel shafts rotatably mounted in said frame, digital proportional gear means inter-connecting said shafts, dial means securely mounted on said shafts, punch blades slidably mounted on said shafts, a punch blade backing plate mounted in said frame in a uniformly spaced relationship to said punch blades and a punch drive bar means operably constructed and arranged to force said punch blade into engagement with said backing plate responsive to lateral movement into operable position of said punch drive bar.

2. The invention of claim 1 including a coding bar comprising multiple punch blades constructed and arranged to move responsive to lateral movement of said punch drive bar operably engaging said backing plate.

3. The invention of claim 1 wherein said punch drive bar means comprises an electrically activated solenoid adapted and arranged to impart lateral motion to said punch drive bar.

4. The invention of claim 1 including a manually activated punch drive bar means adapted to impart lateral motion to said punch blade means thereby bringing said punch blade means into operable contact with said backing plate.

5. A punch card meter reading device comprising a rotary motion drive means rotating proportionally to product dispensed, digital clocking means, gear means interconnecting said rotary motion drive means and said clocking means, said clocking means comprising multiple shaft means and gear means interconecting said shaft means, punch point blades slidably mounted on said shafts, a punch drive bar adjacent said punch point blades, a solenoid secured to said punch drive bar, a punch bar backing plate positioned substantially parallel to said punch drive bar and punch point blades, an external source of electricity, switch means interconecting said external source of electricity and said solenoid, said solenoid operably engaging said punch drive bar for advancing said punch drive bar responsive to the energizing of said solenoid thereby forcing said punch blades into engagement with said backing plate.

6. The invention of claim 5 wherein said switching means comprises a punch card activated microswitch electrically activating said solenoid.

7. The invention of claim 5 wherein said switching means comprises a push button activated solenoid imparting lateral motion to said punch drive bar.

8. A punch card meter reading device comprising a component mounting frame, a measuring means rotating proportionally to product dispensed, a multiplicity of parallel shafts rotatably mounted in said frame, proportional gearing means interconnecting said shafts, dial means securely mounted on said shafts, punch blades slidably mounted on said shafts, a punch blade backing plate mounted in said frame in a uniformly spaced relation to said punch blades, a coding bar including multiple punch blades, a solenoid mounted in said frame, an external source of electricity, conductor means including a switch interconnecting said source of electricity and said solenoid, a punch drive bar operably attached to said solenoid, said punch drive bar advancing responsive to the energizing of said solenoid forcing said punch blades and coding bar into engagement with said backing plate.

(References on following page)

References Cited

UNITED STATES PATENTS

| | | |
|---|---|---|
| 2,148,500 | 2/1929 | Potts. |
| 2,796,315 | 1/1957 | Moodie _____ 346—82 X |
| 3,051,374 | 8/1962 | Braun _____ 234—59 X |
| 3,168,981 | 2/1965 | Goy et al. _____ 346—78 X |
| 3,236,444 | 2/1966 | Richter. |
| 3,263,914 | 8/1966 | Huber _____ 234—30 |
| 3,381,561 | 5/1968 | Bodoh _____ 83—561 X |

FOREIGN PATENTS

| | | |
|---|---|---|
| 1,124,714 | 3/1962 | Germany. |
| 1,152,551 | 8/1963 | Germany. |

WILLIAM S. LAWSON, Primary Examiner

U.S. Cl. X.R.

83—561; 234—45, 107; 324—113; 346—78, 82